(12) United States Patent
Zavaliche et al.

(10) Patent No.: US 9,842,616 B1
(45) Date of Patent: Dec. 12, 2017

(54) SELECTIVE HEAT-ASSISTED REMOVAL OF HEAD OVER-COAT AND MEDIA OVER-COAT

(71) Applicant: Seagate Technology LLC, Cupertino, CA (US)

(72) Inventors: Florin Zavaliche, San Ramon, CA (US); Paul M. Jones, Palo Alto, CA (US); Jan-Ulrich Thiele, Sunnyvale, CA (US); ZhaoHui Fan, Fremont, CA (US); Bing Zhang, San Jose, CA (US); Emil John C. Esmenda, Pleasanton, CA (US); XiaoPing Yan, Pleasanton, CA (US); Xiaoding Ma, Fremont, CA (US); Fujian Huang, San Jose, CA (US); Huan Tang, Los Altos, CA (US)

(73) Assignee: Segate Technology LLC, Cupertino, CA (US)

( * ) Notice: Subject to any disclaimer, the term of this patent is extended or adjusted under 35 U.S.C. 154(b) by 0 days.

(21) Appl. No.: 15/332,851

(22) Filed: Oct. 24, 2016

(51) Int. Cl.
*G11B 5/187* (2006.01)
*G11B 5/33* (2006.01)
*G11B 5/40* (2006.01)
*G11B 5/00* (2006.01)

(52) U.S. Cl.
CPC ........ *G11B 5/40* (2013.01); *G11B 2005/0021* (2013.01)

(58) Field of Classification Search
CPC ......... G11B 5/40; G11B 5/6082; G11B 5/187; G11B 5/314; G11B 5/3903; G11B 2005/002; G11B 2005/0005; G11B 5/1871; G11B 5/00; G11B 27/36

USPC .. 360/59, 313, 328, 125.33, 125.38, 125.74, 360/122; 369/13.13, 13.32, 13.33
See application file for complete search history.

(56) References Cited

U.S. PATENT DOCUMENTS

| | | |
|---|---|---|
| 6,307,832 B1 | 10/2001 | Novotny et al. |
| 8,064,311 B2 | 11/2011 | Holbrook et al. |
| 8,910,338 B2 | 12/2014 | Nagata et al. |
| 9,437,221 B2 | 9/2016 | Lee et al. |
| 9,460,739 B1 * | 10/2016 | Marchon |

OTHER PUBLICATIONS

James D. Kiely, Paul M. Jones, Y.Yang, John L. Brand, Manuel Anaya-Dufresne, Patrick C. Fletcher, Florin Zavaliche, Yvete Toivola, John C. Duda, and Michael T. Johnson, "Write-Induced Head Contamination in Heat-Assisted Magnetic Recording", TMRC 2016 Presentation, pp. 1-18, Seagate Technology.

R. Ikkawi, N. Amos, A. Lavrenov, A. Krichevsky, D. Teweldebrhan, S. Ghosh, A.A. Balandin, D. Litvinov, and S. Khizroev, "Near-Field Optical Transducer for Heat-Assisted Magnetic Recording for Beyond-10-Tbit/in2 Densities", Journal of Nanoelectronic and Optoelectronics, vol. 3, pp. 44-54, American Scientific Publishers 2008, USA.

* cited by examiner

*Primary Examiner* — Nabil Hindi

(57) ABSTRACT

Provided herein is an apparatus including a head over-coat and a depleted region in the head over-coat. A media over-coat is deposited in the depleted region. A near field transducer is adjacent to the head over-coat, wherein the near field transducer combusts the deposited media over-coat.

20 Claims, 4 Drawing Sheets

US 9,842,616 B1

SELECTIVE HEAT-ASSISTED REMOVAL OF HEAD OVER-COAT AND MEDIA OVER-COAT

BACKGROUND

Continuous device downscaling, growing integration densities of nanoscale electronics, and development of alternative information processing paradigms are just a few of the technologies driving a desire to increase data storage capacity. One solution to increase data storage capacity are heat-assisted magnetic recording systems which use near-field optical transducers to heat magnetic recording layers during writing operations. As a result, heat assisted magnetic recording systems use not only magnetic but also thermal energy. Such heat assisted magnetic recording systems use recording media with magnetic recording layers having substantially higher anisotropy in order to achieve ultra-high recording densities. As a result, thermal management of media thin films is an important aspect of heat-assisted magnetic recording.

SUMMARY

Provided herein is an apparatus including a head over-coat and a depleted region in the head over-coat. A media over-coat is deposited in the depleted region. A near field transducer is adjacent to the head over-coat, wherein the near field transducer combusts the deposited media over-coat. These and various other features and advantages will be apparent from a reading of the following detailed description.

DESCRIPTION

Figure 1:
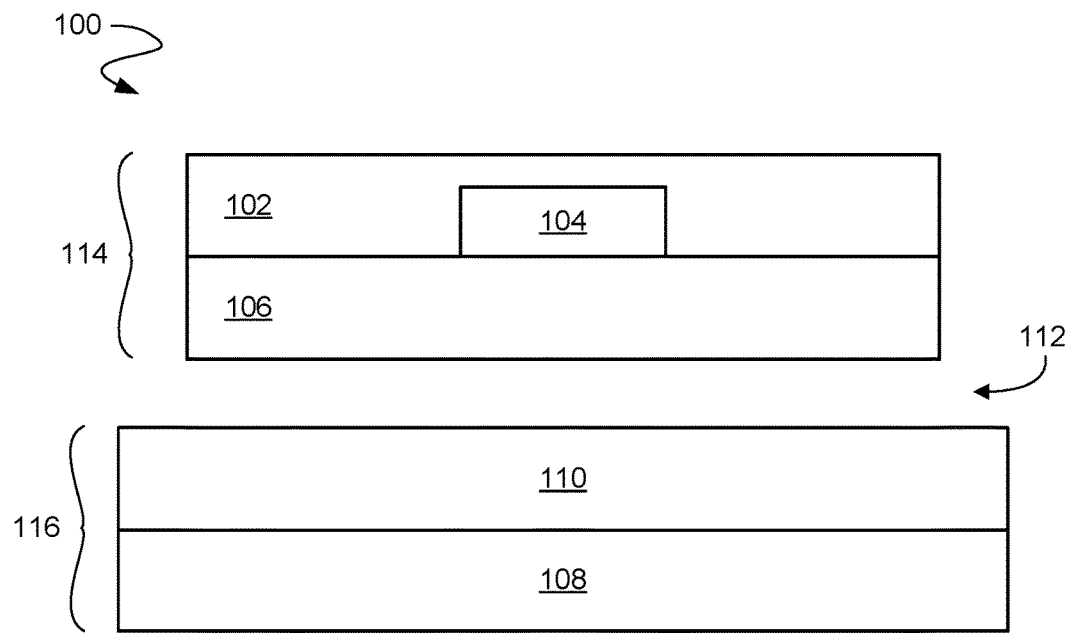
FIG. 1 shows a drive read/write head with a near field transducer and a drive media with an over-coat susceptible to heat initiated out-diffusion according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Heat assisted magnetic recording ("HAMR") systems locally heat a recording medium (e.g. a disk) to temporarily reduce the coercivity (e.g. magnetically soften) of the magnetic medium. The reduced coercivity of the magnetic medium allows magnetic writing fields to more easily write to magnetic layers within the medium during the temporary magnetic softening caused by a heat source. Once the heated magnetic medium cools to ambient temperature, the coercivity returns to a sufficiently high value to ensure magnetic stability of the recorded information. As a result, HAMR allows for the use of small grain media, with a larger magnetic anisotropy at room temperature to assure sufficient stability for recording at increased areal densities. HAMR can be applied to any type of magnetic storage media including (but not limited to) tilted media, longitudinal media, perpendicular media, and patterned media.

Various HAMR systems use a near field transducer ("NFT") within the drive read/write head to generate the heat used during writing processes. However, the high temperatures generated by the NFT can damage the drive read/write head. For example, head over-coat in the area of the NFT can be lost due to combustion, thereby leaving a depleted region in the head over-coat. The depleted region can lead to premature corrosion of the NFT.

In addition, the depleted region may be filled with contaminants which quickly grow beyond the depleted region, covering larger and larger areas of the drive read/write head. As such, the contaminants form a contaminated area that causes problems including (but not limited to) a loss of coupling efficiency between the drive head and the magnetic medium and a degradation of recording performance. As the contaminated area continues to expand, it may quickly grow large enough to contact and damage the magnetic medium, thereby causing the drive to fail.

In order to solve these problems, significant effort has been directed to designing over-coats with high thermal and mechanical robustness, which are not affected by the intense heat generated by the NFT. However, in the embodiments described herein it has been unexpectedly discovered that using a media over-coat that is susceptible to damage in the form of, for example, controllable out-diffusion may surprisingly prevent degradation of the recording performance.

Referring now to FIG. 1, it is understood that the Figures presented herein are figurative representations of a disk drive system 100, wherein information is magnetically written to a disk drive magnetic storage medium (e.g. a disk) with at least one disk drive head (e.g. a read/write head). For clarity of illustration, elements and designs of the disk drive system 100 have been greatly simplified, sizes altered, and relative dimensions also altered. For example, media and head layers are not illustrated as well as many head components (e.g. write pole, return pole, actuators, etc.). It is understood that embodiments described herein include any disk drive HAMR system with a head over-coat and a media over-coat.

The disk drive system 100 includes a media facing portion 102 of the drive read/write head with a near field transducer 104 and a head over-coat 106 (e.g. overlying head over-coat in various orientations, underlying over-coat in other orientations, etc.). One of the functions of the head over-coat 106 is to protect the media facing portion 102 including the near field transducer 104. As such, the head over-coat 106 is on the media facing portion 102 with the near field transducer 104. For clarity of description, the head over-coat 106 and the media facing portion 102 are described separately. However, it is understood that various designs may include the head over-coat 106 as part of the media facing portion 102, and embodiments described herein include such designs.

The disk drive system 100 also includes a drive media 108 with a media over-coat 110 (e.g. overlying media over-coat in various orientations, underlying over-coat in other orientations, etc.). One of the functions of the media over-coat 110 is to protect the drive media 108. In addition, the media over-coat 110 interacts with the head over-coat 106 to form an air bearing 112 between a magnetic write head 114 (including at least the media facing portion 102, the near field transducer 104, and the head over-coat 106) and the magnetic recording media 116 (including at least the drive media 108 and the media over-coat 110). In some embodiments, the magnetic write head assembly may include various combinations of one or more of a read sensor, write pole, heater elements, near field transducer, laser light source, and other magnetic write head elements. In various embodiments, the interaction of the media over-coat 110 with the head over-coat 106 occurs when the media with media over-coat is rotated with respect to the near field transducer 104, resulting in the formation of the air bearing 112.

As discussed above, the heat generated by the near field transducer 104 in HAMR drive systems can cause damage to the head over-coat 106. The effects of such damage can lead to damage of the media over-coat 110, degradation of drive performance, and eventual drive failure. Instead of increasing the robustness of the over-coats to resist heat damage, it has been unexpectedly discovered that engineering the media over-coat 110 to be controllably susceptible to heat initiated out-diffusion will reduce and/or prevent detrimental effects to the disk drive system 100. As such, in embodiments described herein the near field transducer 104 is designed and configured to ablate the head over-coat 106 on the near field transducer 104. In addition, the media over-coat is designed and configured to evaporate in response to the heat emitted from the near field transducer 104.

Figure 2:
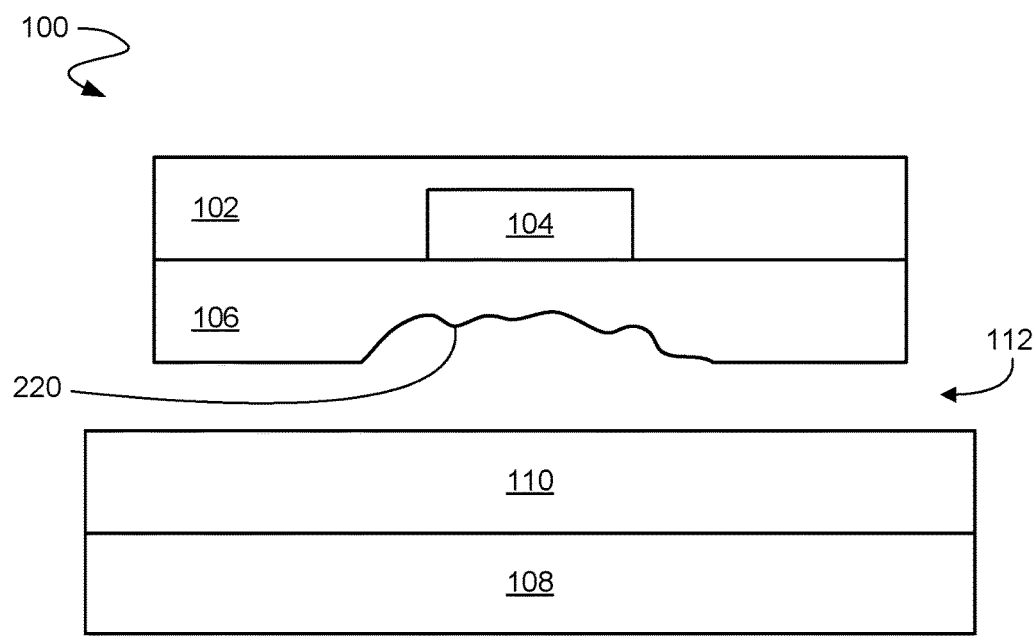
FIG. 2 shows a damaged area of the head over-coat according to one aspect of the present embodiments.

Referring now to FIG. 2, a damaged area 220 of the head over-coat 106 is shown according to one aspect of the present embodiments. As previously discussed, during drive operation the near field transducer 104 is adjacent to the head over-coat 106 and generates heat that damages the head over-coat 106. In various embodiments, other heat generation sources (e.g. laser) may be used in the disk drive system 100 for HAMR processes. For example, a portion of the head over-coat 106 may combust, vaporize, ablate, etc., leaving a head over-coat damaged area 220 in the form of a depleted region in the head over-coat 106. As a result, the head over-coat damaged area 220 is thinner than adjacent regions of the head over-coat 106.

In various embodiments, the size and depth of the head over-coat damaged area 220 may be different. For example, the head over-coat damaged area 220 may extend only partially through the thickness of the head over-coat 106. On the other hand, the head over-coat damaged area 220 may extend through the entire thickness of the head over-coat 106, thereby exposing the near field transducer 104 and/or the media facing portion 102.

Figure 3:
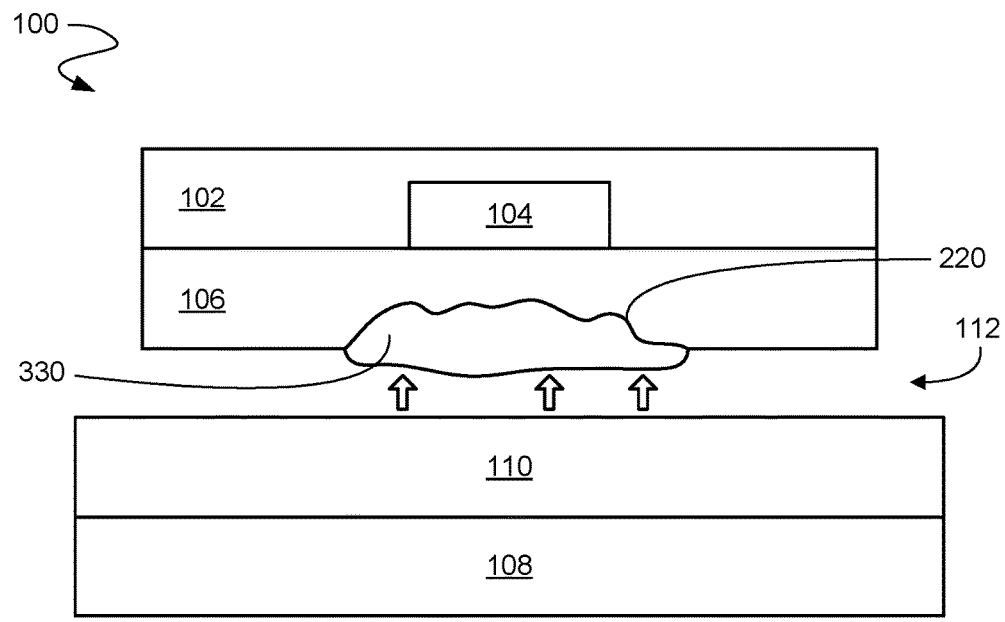
FIG. 3 shows a media over-coat filling the damaged area of the head over-coat according to one aspect of the present embodiments.

Referring now to FIG. 3, a transferred media over-coat 330 filling the head over-coat damaged area 220 is shown according to one aspect of the present embodiments. During the HAMR writing process the heat generated by the near field transducer 104 causes a portion of the media over-coat 110 to evaporate and out-diffuse. A portion of the evaporated portion of the media over-coat 110 condenses and is deposited in the head over-coat damaged area 220. As such, the transferred media over-coat 330 repairs the damaged head over-coat 106 through the evaporation and condensation of the media over-coat 110. In embodiments described herein, this process is controllable (e.g. by tuning the heat generated and absorbed in the media overcoat, or by materials selections) in order to keep the air bearing 112 free of the transferred media over-coat 330 that has condensed in the head over-coat damaged area 220 and to protect the head and head elements against corrosion.

As previously discussed, the figures and elements in the figures are not drawn to scale and relative sizes are greatly distorted for clarity of illustration. Therefore it is understood that the evaporation of the media over-coat 110 is very small and not a significant volume that will negatively impact the operation of the disk drive system 100. Furthermore in various embodiments, the out-diffusion, or thermal-induced desorption process, is confined to the area of the heat spot (approximately of the same size as the near field transducer 104), resulting in a small localized desorption from the media over-coat 110 to the damaged area 220. As a consequence, the volume of the media over-coat 110 is large enough (in comparison to the very small localized heat spot) that the loss of media over-coat 110 over the life of the drive does not negatively impact performance.

Figure 4:
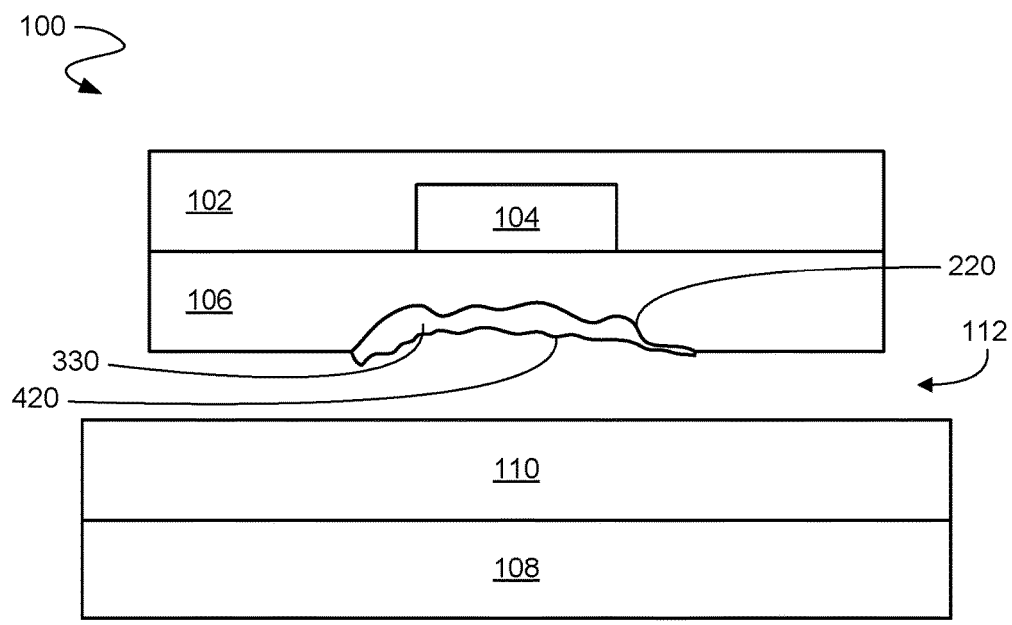
FIG. 4 shows a damaged area of the media over-coat filling the damaged area of the head over-coat according to one aspect of the present embodiments.

Referring now to FIG. 4, a transferred media over-coat damaged area 420 of the transferred media over-coat 330 filling the head over-coat damaged area 220 is shown according to one aspect of the present embodiments. In embodiments described herein, the heat generated by the near field transducer 104 additionally damages the transferred media over-coat 330, thereby forming the transferred media over-coat damaged area 420. For example, the near field transducer 104 adjacent to the head over-coat 106 is designed and configured to combust, vaporize, ablate, etc. at least a part of a portion of the transferred media over-coat 330. In addition, at least a part of the portion of the transferred media over-coat 330 that has condensed and deposited over the near field transducer 104 is designed and configured to ablate in response to the heat emitted from the near field transducer 104. Such a process creates the transferred media over-coat damaged area 420 in the form of a depleted region in the transferred media over-coat 330, located within the head over-coat 106.

Figure 5:
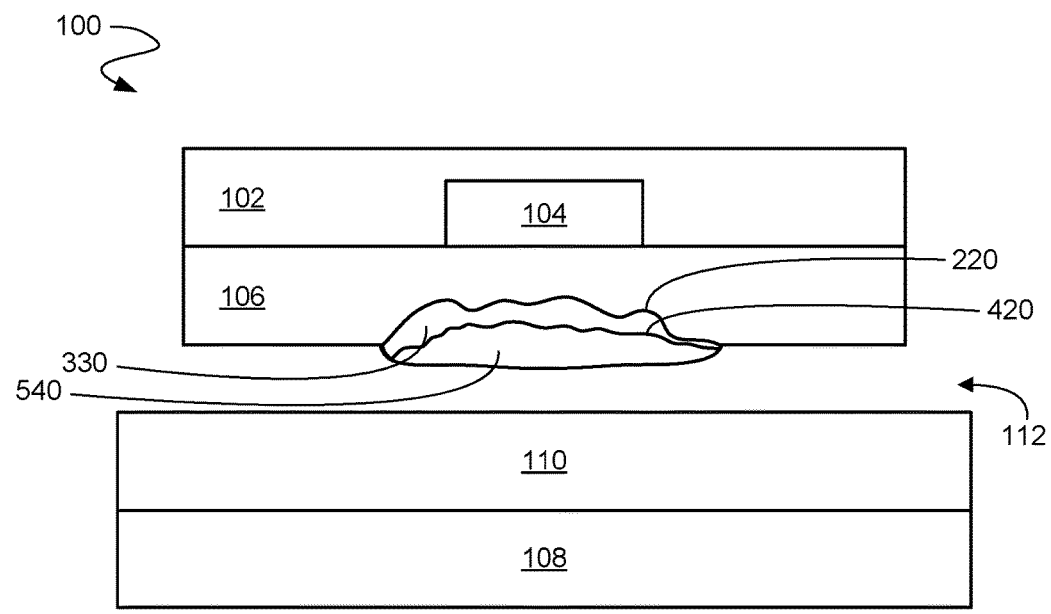
FIG. 5 shows additional media over-coat filling the damaged area of the media over-coat filling the damaged area of the head over-coat according to one aspect of the present embodiments.

Referring now to FIG. 5, additional media over-coat 540 filling the transferred media over-coat damaged area 420 is shown according to one aspect of the present embodiments. During additional HAMR writing processes the heat generated by the near field transducer 104 continues to cause a portion of the media over-coat 110 to evaporate and out-diffuse. The evaporated portion of the media over-coat 110 condenses and is deposited in the damaged area of the transferred media over-coat 330.

As such, a repetitive cycle of damage and repair occurs with the transferred media over-coat 330 and the additional media over-coat 540. The damage and repair cycle keeps the air bearing 112 free of the transferred media over-coat 330. In doing so, the HAMR head does not physically contact the HAMR media because the growth and reduction of the transferred media over-coat 330 is controlled. Such a controlled growth and reduction not only prevents the HAMR drive from crashing, but it also maintains desirable read/write functionality by keeping areas (e.g. read and write poles) of the media facing portion 102 free of condensed media over-coat and protected against corrosion.

Therefore, FIGS. 1-5 illustrate the operation of a HAMR drive according to embodiments described herein. Initially the head over-coat is undamaged. As the HAMR head writes to the HAMR media, the head over-coat becomes damaged and a damaged area forms in the head over-coat near the heat source. In addition to damaging the head over-coat, the heat causes a very small portion of the media over-coat to transfer from the HAMR media to the damaged area of the HAMR head. Therefore, the HAMR head now includes media over-coat as well as head over-coat, both protecting the HAMR head.

As the HAMR drive continues to operate, the HAMR head continually receives damage (e.g. the heat repeatedly damages the media over-coat that is transferred to the HAMR head). Consequently, a continuous cycle of HAMR head damage and repair occurs on the HAMR head as the transferred media over-coat is repeatedly removed and deposited.

Figure 6:
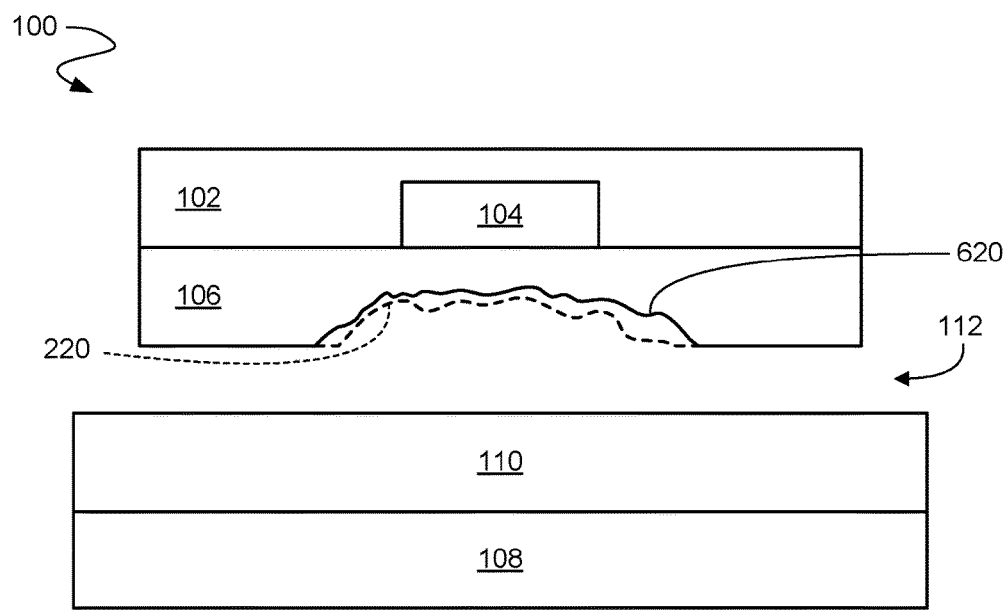
FIG. 6 shows damage resulting in complete removal of the media over-coat filling the damaged area of the head over-coat as well as additional damage to the head over-coat according to one aspect of the present embodiments.

Referring now to FIG. 6, damage resulting in complete removal of the transferred media over-coat 330 (see FIG. 3) filling the head over-coat damaged area 220 as well as additional damage to the head over-coat 106 is shown according to one aspect of the present embodiments. In some embodiments, the damage caused by the near field transducer 104 may create a larger damaged area 620 (for reference, the dashed line shows the boundary of the head over-coat damaged area 220 described in earlier Figures). The larger damaged area 620 may result from complete removal of the transferred media over-coat 330 (see FIG. 3) as well as additional damage to the head over-coat 106. In various embodiments, the operations of the drive will continue as described above including the transfer of the media over-coat 110 to repair the larger damaged area 620.

Figure 7:
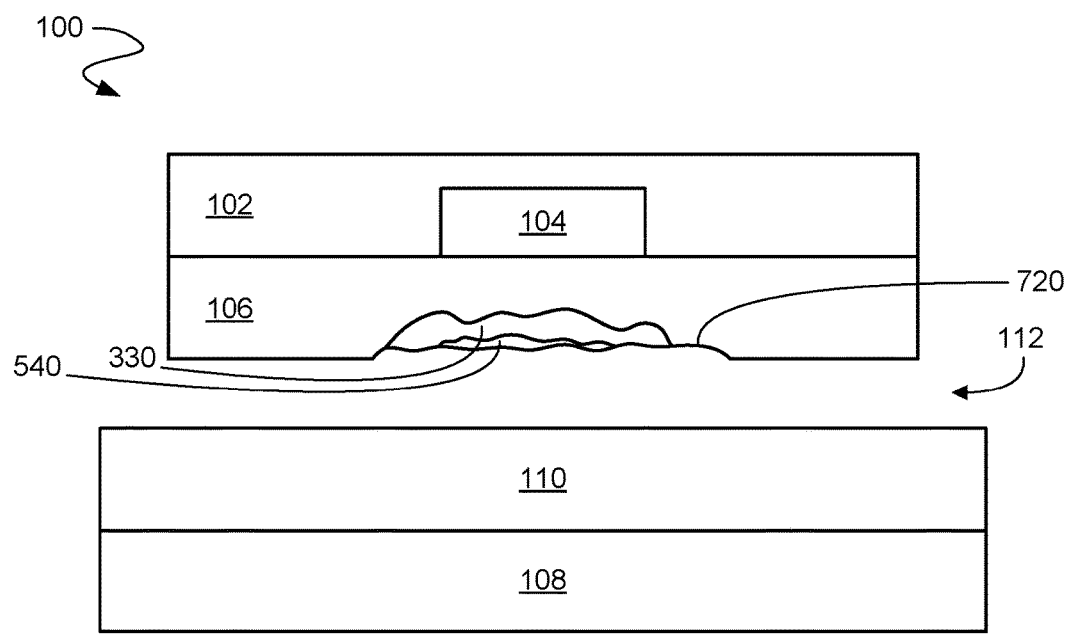
FIG. 7 shows damage resulting in removal of a portion of the additional media over-coat, removal of a portion of the media over-coat filling the damaged area of the head over-coat, and additional damage to the head over-coat according to one aspect of the present embodiments.

Referring now to FIG. 7, further damage 720 resulting in removal of a portion of the additional media over-coat 540, removal of a portion of the transferred media over-coat 330 filling the damaged area of the head over-coat 106, and additional damage to the head over-coat 106 is shown according to one aspect of the present embodiments. In some embodiments, the damage caused by the near field transducer 104 may create damage to the additional media over-coat 540, the transferred media over-coat 330, and the head over-coat 106. In further embodiments, damage may occur to any combination of the head over-coat 106 and/or one or more layers of media over-coat deposited on the HAMR head. In various embodiments, the operations of the drive will continue as described above including the transfer of the media over-coat 110 to repair damaged areas on the HAMR head.

The FIGS. 1-7 also illustrate embodiments including a method of heating a near field transducer, removing a portion of a head over-coat on the near field transducer in response to the heating and potential mechanical interaction with tall media defects such as particles. For example, in FIGS. 1-2 the near field transducer 104 generates heat that damages the head over-coat 106. The removing forms a depleted region in the head over-coat. For example, in FIG. 2 a portion of the head over-coat 106 may combust, vaporize, ablate, etc., leaving the head over-coat damaged area 220 in the form of a depleted region in the head over-coat 106. A portion of a media over-coat is released from a media in response to the heating, and the released portion of the media over-coat is deposited in the depleted region. For example, in FIG. 3 the evaporated portion of the media over-coat 110 condenses and is deposited in the head over-coat damaged area 220.

In some embodiments, a portion of the deposited media over-coat in the depleted region is removed in response to subsequent heating by the near field transducer. For example, in FIG. 4 the heat generated by the near field transducer 104 additionally damages the transferred media over-coat 330, thereby forming the transferred media over-coat damaged area 420.

In various embodiments, the removed portion of the deposited media over-coat is replaced with an additional released portion of the media over-coat. For example, in FIG. 5 the evaporated portion of the media over-coat 110 condenses and is deposited in the damaged area of the transferred media over-coat 330.

In further embodiments, the removing of the portion of the deposited media over-coat in the depleted region maintains a gap between the deposited media over-coat and the media over-coat. For example, in FIG. 5 the damage and repair cycle keeps the air bearing 112 free of the transferred media over-coat 330.

In some embodiments, information is written from a write pole to a recording layer underlying the media over-coat, wherein there is no deposited media over-coat between the write pole and the recording layer. For example, in FIG. 5 the controlled growth and reduction of the transferred media over-coat 330 and the additional media over-coat 540 not only prevents the HAMR drive from crashing, but also maintains desirable read/write functionality by keeping areas (e.g. read and write poles) of the media facing portion 102 of the disk drive read/write head free of condensed media over-coat.

In various embodiments, the media with media over-coat is rotated with respect to the near field transducer, wherein the head over-coat and the deposited media over-coat do not contact the media. For example, as previously stated in FIGS. 1 and 5 the media with media over-coat 110 rotates past the head over-coat 110, forming the air bearing 112. In addition, the damage and repair cycle keeps the air bearing 112 free of the transferred media over-coat 330. As a result, the HAMR head does not physically contact the HAMR media because the growth and reduction of the transferred media over-coat 330 is controlled.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
    a magnetic write head including,
        a near field transducer, and
        a head over-coat on the near field transducer, wherein the near field transducer ablates the head over-coat on the near field transducer; and
    a magnetic recording media including a media over-coat, wherein
        the media over-coat is evaporated in response to heat emitted from the near field transducer,
        a portion of the media over-coat that is evaporated is subsequently condensed over the near field transducer, and
        at least a part of the portion of the media over-coat that is condensed over the near field transducer is ablated in response to the heat emitted from the near field transducer.

2. The apparatus of claim 1, wherein the head over-coat includes a depleted region, and wherein the media over-coat is condensed in the depleted region.

3. The apparatus of claim 1, wherein an air bearing is formed between the magnetic write head and the magnetic recording media.

4. The apparatus of claim 3, wherein the air bearing is free of the media over-coat that is condensed.

5. The apparatus of claim 1, wherein the magnetic write head does not physically contact the magnetic recording media.

6. The apparatus of claim 1, wherein a first region of the head over-coat adjacent to the near field transducer is shallower than a second region of the head over-coat.

7. The apparatus of claim 1, further comprising a write pole, wherein the write pole is free of the media over-coat that is condensed.

8. An apparatus comprising:
    a head over-coat;
    a depleted region in the head over-coat;
    a deposited media over-coat in the depleted region; and
    a near field transducer adjacent to the head over-coat, wherein the near field transducer is operable to combust the deposited media over-coat.

9. The apparatus of claim 8, further comprising a recording device including a media over-coat, wherein the deposited media over-coat evaporates from the media over-coat in response to heat created by the near field transducer.

10. The apparatus of claim 8, further comprising an air bearing adjacent to the head over-coat.

11. The apparatus of claim 10, wherein the air bearing is free of the deposited media over-coat.

12. The apparatus of claim 8, wherein the deposited media over-coat does not physically contact a magnetic recording media.

13. The apparatus of claim 8, wherein the depleted region is thinner than an adjacent region of the head over-coat.

14. The apparatus of claim 8, further comprising a write pole, wherein the write pole is free of the deposited media over-coat.

15. A method comprising:
    heating a near field transducer;
    removing a portion of a head over-coat on the near field transducer in response to the heating, wherein the removing forms a depleted region in the head over-coat;
    releasing a portion of a media over-coat from a media in response to the heating; and
    depositing the released portion of the media over-coat in the depleted region.

16. The method of claim 15, further comprising removing a portion of the deposited media over-coat in the depleted region in response to subsequent heating by the near field transducer.

17. The method of claim 16, further comprising replacing the removed portion of the deposited media over-coat with an additional released portion of the media over-coat.

18. The method of claim 16, wherein the removing of the portion of the deposited media over-coat in the depleted region maintains a gap between the deposited media over-coat and the media over-coat.

19. The method of claim 15, further comprising writing information from a write pole to a recording layer underlying the media over-coat, wherein there is no deposited media over-coat between the write pole and the recording layer.

20. The method of claim 15, further comprising rotating the media over-coat with respect to the near field transducer, wherein the head over-coat and the deposited media over-coat do not contact the media.

* * * * *